US010572609B2

(12) United States Patent
Kang et al.

(10) Patent No.: US 10,572,609 B2
(45) Date of Patent: Feb. 25, 2020

(54) METHOD AND APPARATUS TO MODEL OBJECTS INCLUDING PARTICLES

(71) Applicant: Samsung Electronics Co., Ltd., Suwon-si (KR)

(72) Inventors: Nahyup Kang, Seoul (KR); Jiyeon Kim, Hwaseong-si (KR); Hyong Euk Lee, Suwon-si (KR); Hwiryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 14/940,740

(22) Filed: Nov. 13, 2015

(65) Prior Publication Data

US 2016/0140266 A1    May 19, 2016

(30) Foreign Application Priority Data

Nov. 13, 2014    (KR) .......................... 10-2014-0158083

(51) Int. Cl.
   *G06F 17/50*    (2006.01)
(52) U.S. Cl.
   CPC ...... *G06F 17/5009* (2013.01); *G06F 2217/16* (2013.01)
(58) Field of Classification Search
   CPC .......................... G06F 17/5009; G06F 2217/16
   See application file for complete search history.

(56) References Cited

U.S. PATENT DOCUMENTS

| 7,565,276 | B2 * | 7/2009 | Song | G06F 17/5018 345/474 |
|---|---|---|---|---|
| 2008/0189068 | A1 * | 8/2008 | Brusoe | G01M 17/0078 702/113 |
| 2010/0057408 | A1 * | 3/2010 | Jandhyala | G06F 17/5009 703/2 |
| 2010/0094608 | A1 * | 4/2010 | Oh | G06F 17/5009 703/9 |
| 2012/0123754 | A1 * | 5/2012 | Bodin | G06F 17/5018 703/2 |
| 2012/0284002 | A1 | 11/2012 | McDaniel et al. | |
| 2012/0296615 | A1 | 11/2012 | Shim et al. | |
| 2012/0316848 | A1 | 12/2012 | Noh et al. | |

(Continued)

FOREIGN PATENT DOCUMENTS

| JP | 3851848 B2 | 11/2006 |
|---|---|---|
| JP | 2011-248878 A | 12/2011 |

(Continued)

OTHER PUBLICATIONS

Carlson, M. et al., "Rigid fluid: animating the interplay between rigid bodies and fluid," ACM Transactions on Graphics (TOG), vol. 23, No. 3, ACM, 2004 (8 pages in English).

(Continued)

*Primary Examiner* — Aniss Chad
(74) *Attorney, Agent, or Firm* — NSIP Law

(57) ABSTRACT

A method and corresponding apparatus to model objects includes detecting an overlapping area between first and second objects each comprising particles. The method and corresponding apparatus also calculate, in the overlapping area, an action force between the first and the second objects. The method and corresponding apparatus model the first object and the second object based on the action force.

26 Claims, 11 Drawing Sheets

(56) References Cited

U.S. PATENT DOCUMENTS

2013/0116997 A1   5/2013  Sun et al.
2013/0151221 A1   6/2013  Chen et al.
2016/0063140 A1   3/2016  Kang et al.

FOREIGN PATENT DOCUMENTS

| KR | 10-0915523 B1 | 9/2009 |
|---|---|---|
| KR | 10-0948159 B1 | 3/2010 |
| KR | 10-2012-0072132 A | 7/2012 |
| KR | 10-1219534 B1 | 1/2013 |
| KR | 10-1244826 B1 | 3/2013 |

OTHER PUBLICATIONS

Kim, E., "Interactive Simulation between Rigid body and Fluid using Simplified Fluid-Surface Model," Journal of Korea Multimedia Society, vol. 12, No. 2, 2009 (pp. 323-328).

\* cited by examiner

METHOD AND APPARATUS TO MODEL OBJECTS INCLUDING PARTICLES

CROSS-REFERENCE TO RELATED APPLICATION(S)

This application claims the benefit under 35 USC 119(a) of Korean Patent Application No. 10-2014-0158083, filed on Nov. 13, 2014, in the Korean Intellectual Property Office, the entire disclosure of which is incorporated herein by reference for all purposes.

BACKGROUND

1. Field

The following description relates to a method and apparatus to model objects including particles.

2. Description of Related Art

Ongoing research is being performed with respect to a fluid simulation in a computer graphics (CG) field, in particular, in a visual effects (VFX) field, to digitize a fluid movement. A Navier-Stokes equation is directed to a fluid as a sum of minute particles. The Navier-Stokes equation represents interactions and movements between particles.

In the CG field, a simulation of a fluid object and a simulation of a deformable object are separately performed. However, in a general environment, the fluid object and the deformable object coexist and affect each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to model objects, the method including detecting an overlapping area between first and second objects each including particles; calculating, in the overlapping area, an action force between the first and the second objects; and modeling the first object and the second object based on the action force.

The calculating may include calculating, in the overlapping area, a buoyancy due to the first object overlapping the second object.

The calculating may include calculating, in the overlapping area, velocities of the particles comprised in the first object based on velocities of the particles comprised in the second object.

The modeling may include modeling, in the overlapping area, a motion of the first object independent of the second object.

The calculating may include calculating the action force between the first and the second objects based on a position of the second object in a surface area of the first object, which includes the overlapping area.

The calculating may include: detecting particles of the first object generated from a collision between the particles of the first object and the particles of the second object in the surface area of the first object; redefining positions of the detected particles of the first object; and calculating an action force applied to the second object due to the collision, based on the redefined positions of the particles of the first object.

The redefining may include redefining the positions of the particles of the first object as positions at which the first object does not penetrate the second object.

The redefining may include: calculating moving directions of the particles of the first object not penetrating the second object; and moving the positions of the particles of the first object based on the calculated moving directions.

The method may further include calculating, in the overlapping area, velocities of the particles comprised in the first object based on velocities of the particles comprised in the second object; and wherein the moving may include moving the positions of the particles of the first object based on the calculated moving directions and the calculated velocities of the particles comprised in the first object.

The calculating may include: estimating, at the redefined positions of the particles of the first object, forces received by the particles of the first object from the second object; and calculating the action force applied to the second object due to the collision, based on the estimated forces.

The first object may be a fluid object and the second object may be a deformable object.

In accordance with an embodiment, there is provided a non-transitory computer-readable storage medium including a program including instructions to cause a computer to perform the method described above.

In accordance with an embodiment, there is provided an apparatus to model objects, the apparatus including a detecting processor configured to detect an overlapping area between first and second objects each including particles; and a model processor configured to model the first and the second objects based on an action force between the first and the second objects calculated in the overlapping area.

The apparatus may also include a memory configured to store a program to control the apparatus.

The apparatus may also include a calculation processor configured to calculate, in the overlapping area, a buoyancy due to the first object overlapping the second object.

The apparatus may also include may further include a calculation processor configured to calculate, in the overlapping area, velocities of the particles comprised in the first object based on velocities of the particles comprised in the second object.

The apparatus may also include may further include a model processor configured to model, in the overlapping area, a motion of the first object independent of the second object.

The apparatus may also include may further include an action force processor configured to calculate the action force between the first and the second objects, based on positions of the second object in a surface area of the first object that includes the overlapping area.

The apparatus may also include may further include a detection processor configured to detect particles of the first object generated from a collision between the particles of the first object and the particles of the second object in the surface area of the first object, and calculate an action force applied to the second object due to the collision, based on redefined positions of the detected particles of the first object.

The apparatus may also include may further include a velocity processor configured to calculate, in the overlapping area, velocities of the particles comprised in the first object based on velocities of the particles comprised in the second object, calculate moving directions of the particles of the first object not penetrating the second object, and move the positions of the particles of the first object based on the calculated moving directions and the calculated velocities of the particles comprised in the first object.

The apparatus may also include an estimate processor configured to estimate, in the redefined positions of the particles of the first object, forces received by the particles of the first object from the second object, and calculate the action force applied to the second object due to the collision based on the estimated forces.

In accordance with an embodiment, there is provided an apparatus to model objects, including an overlapping detector configured to detect an overlapping area between a first object and a second object; a particle detector configured to detect particles of the first object generated from a collision between particles of the first object and particles of the second object in the surface area of the first object; a calculation controller configured to calculate moving directions of the particles of the first object not penetrating the second object, and calculate, in the overlapping area, velocities of the particles included in the first object based on velocities of the particles included in the second object; a moving controller configured to move and redefine positions of the particles of the first object based on the moving directions calculated and the velocities of the particles in the first object; and an action force processor configured to estimate, at the redefined positions of the particles of the first object, forces received by the particles of the first object from the second object, to calculate an action force applied to the second object due to the collision based on the estimated forces.

The particles of the first object may be generated are detected based on a position of the second object in a surface area of the first object that includes the overlapping area detected.

The apparatus may also include the first object may be a fluid object and the second object is a deformable object.

Other features and aspects will be apparent from the following detailed description, the drawings, and the claims.

Figure 1:
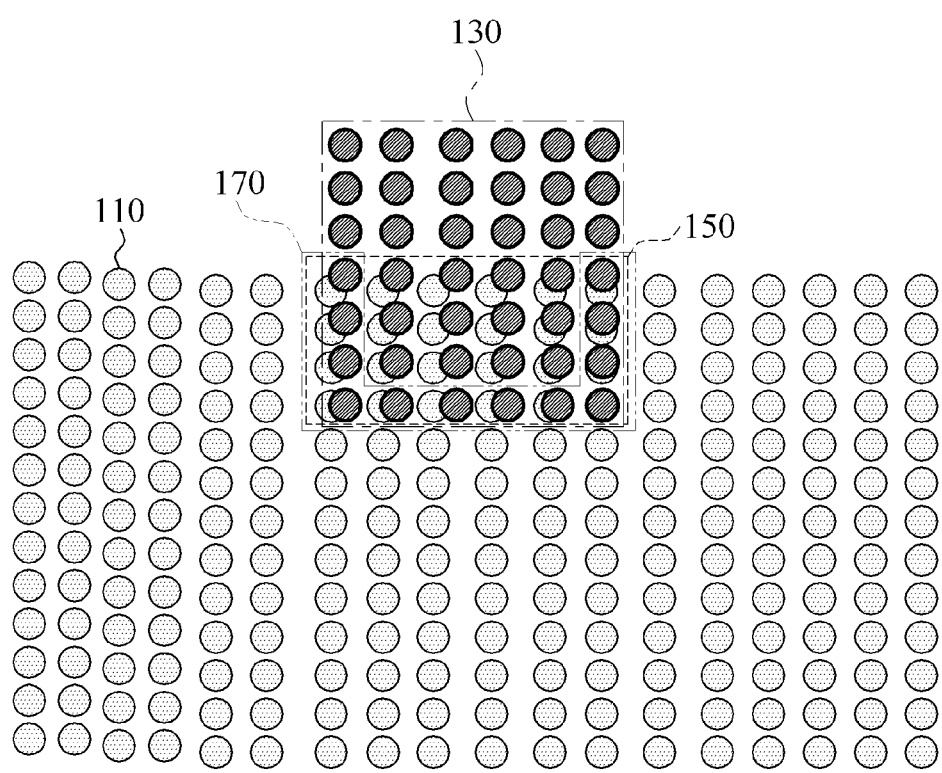
FIG. 1 is a diagram illustrating an example of an overlapping area in which a method of modeling objects including particles is used, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms used herein are to merely explain embodiments, thus it is not meant to be limiting. A singular expression includes a plural expression except that two expressions are contextually different from each other. Herein, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, certain embodiments will be explained in more detail with reference to the attached drawings. The same component or components corresponding to each other will be provided with the same reference numeral, and their detailed explanation will be omitted. When it is determined that a detailed description is related to a related known function or configuration which may make the purpose of the present disclosure unnecessarily ambiguous in the description, such a detailed description will be omitted.

FIG. 1 is a diagram illustrating an example of an overlapping area in which a method to model objects including particles is used, in accordance with an embodiment.

Referring to FIG. 1, a fluid object 110, such as, water and oil, and a deformable object 130, for example, a branch, floating on the fluid object 110 are illustrated. Each of the fluid object 110 and the deformable object 130 may be modeled by particles thereof. In one example, the fluid object 110 is used as a fluid or a domain including particles of an object. The deformable object 130 is used as an object that includes particles placed within an environment of the fluid object 110. The deformable object 130 may be understood as including all forms of rigid and soft bodies.

In an example, the fluid object 110 and the deformable object 130 are included in an area, for example, a portion area of the fluid object 110 including the deformable object 130 or a portion area of the deformable object 130 of which a portion is submerged in the fluid object 110 as illustrated in FIG. 1. In this example, the predetermined area may also be referred to as an overlapping area 150.

Also, a predetermined area including contours of the fluid object 110 and the deformable object 130 may be defined as an adjacent area 170. In one example, overlapping area 150 includes the adjacent area 170 of the deformable object 130.

Figure 2:
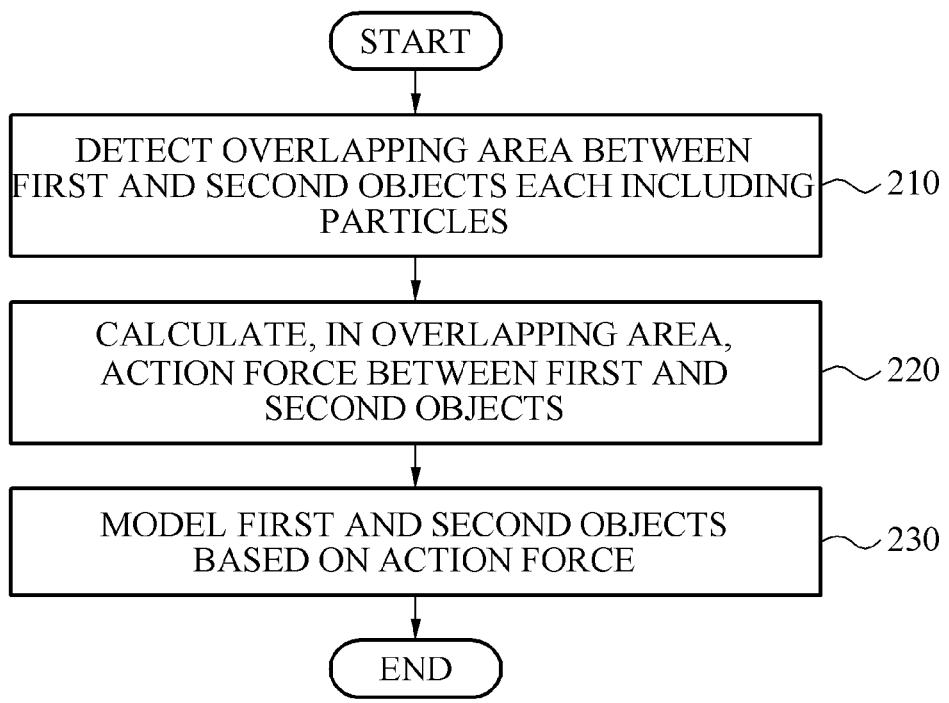
FIG. 2 is a flowchart illustrating an example of a method to model objects including particles, in accordance with an embodiment.

FIG. 2 is a flowchart illustrating an example of a method to model objects including particles, in accordance with an embodiment.

In one illustrative configuration, the method to model the objects is performed in a single processor or in multiple structurally interconnected processors. The processor or processors are hardware structural components that perform the operations described and illustrated with respect to FIG. 2. In one configuration, a detector, a controller, and a model processor may be used to perform operations 210 through 230 described below. Due to the complexities and speed of the processing to model objects, the functions performed in FIG. 2 cannot be performed manually.

Referring to FIG. 2, in operation 210, a method of modeling the objects including the particles (hereinafter, a "modeling method"), detects an overlapping area between a first and a second objects each including particles. In one illustrative example, the first object is a fluid object, and the second object is a deformable object. The first object and the second object are heterogeneous objects, for example, at least one of the fluid object and the deformable object is solid or liquid, or homogeneous objects, for example, water and oil.

When the objects are modeled based on particles, the modeling method locates adjacent particles of any one particle. When the located adjacent particles correspond to different objects having different physical quantities, the modeling method defines an area including any one particle and respective particles determined to differ from one object to another, as an adjacent area. The modeling method detects the overlapping area including the adjacent area as the contour.

In operation 220, the modeling method calculates, in the overlapping area, an action force between the first and the second objects. The modeling method calculates, in the overlapping area, the action force of the first object with respect to the second object.

For example, the action force is buoyancy. That is, the modeling method calculates, in the overlapping area, the buoyancy due to the first object overlapping the second object. The buoyancy is a pressure applied to the deformable object in the fluid object, in a gravitational field, in a direction opposite to gravity based on a sum of a fluid pressure on a surface of the fluid object. When the fluid object is static, the pressure on particles of the fluid object is directed internally to the particles of the fluid object, for example, an isotropy of pressure, from every direction, and is parallel with forces of gravity acting on the particles of the fluid object in a vertical direction.

In operation 230, the modeling method models the first object and the second object based on the action force between the first and the second objects calculated in operation 220. In one illustrative embodiment, the modeling method models the first object and the second object based on only the action force, for example, the buoyancy, of the first object with respect to the second object. The modeling method models the first object and the second object based on all of the action force of the first object with respect to the second object and an action force of the second object with respect to the first object.

For example, when the modeling method only uses the buoyancy due to the first object overlapping the second object, the modeling method models a motion of the first object independent of the second object. The modeling method models the motion of the first object as though the second object does not overlap the first object, although the first object and the second object overlap in actuality.

In an example, when the modeling method models the adjacent area, for example, the overlapping area, with respect to the objects including the particles, a physical effect in response to a collision between the particles may not be reflected. The modeling method may similarly model a visual effect only, thereby rapidly and efficiently modeling the objects.

A modeling method based on a collision and an interaction force between a first and a second objects will be described in reference to FIGS. 5 and 6.

Figure 3:
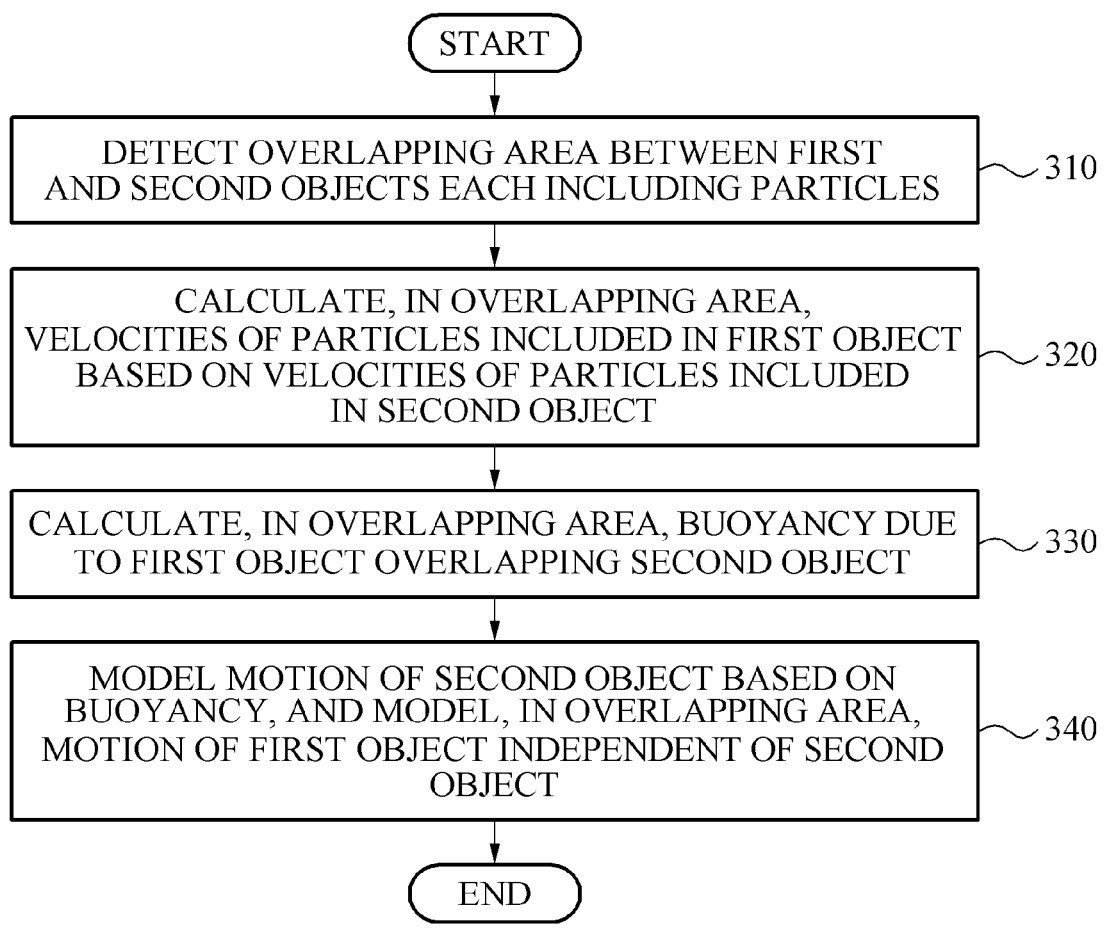
FIG. 3 is a flowchart illustrating another example of a method to model objects including particles, in accordance with an embodiment.

FIG. 3 is a flowchart illustrating another example of a method to model objects including particles, in accordance with an embodiment.

In one illustrative configuration, the method to model the objects is performed in a single processor or in multiple structurally interconnected processors. The processor or processors are hardware structural components that perform the operations described and illustrated with respect to FIG. 3. In one configuration, a detector, a controller, and a model processor may be used to perform operations 310 through 340 described below. Due to the complexities and speed of the processing to model objects, the functions performed in FIG. 3 cannot be performed manually.

Referring to FIG. 3, in operation 310, a modeling method detects an overlapping area between a first and a second objects, each including particles.

In operation 320, the modeling method calculates, in the overlapping area, velocities of the particles included in the first object based on velocities of the particles included in the second object. A method of calculating velocities of particles included in a first object based on velocities of particles included in a second object will be described with reference to FIG. 4.

In operation 330, the modeling method calculates, in the overlapping area, a buoyancy due to the first object overlapping the second object. The buoyancy of the first object may be calculated by Equation 1:

$$\text{buoyancy} = (rho\_s - rho\_f) \times \text{gravity} \qquad \text{[Equation 1]}$$

In Equation 1, rho_s denotes the density of the deformable object and rho_f denotes the density of the fluid object.

In operation 340, the modeling method models a motion of the second object based on the buoyancy calculated in operation 330 and models, in the overlapping area, a motion of the first object independent of the second object. In the modeling method, the second object is influenced by the first object. However, the first object may be modeled without being influenced by the second object.

Figure 4:
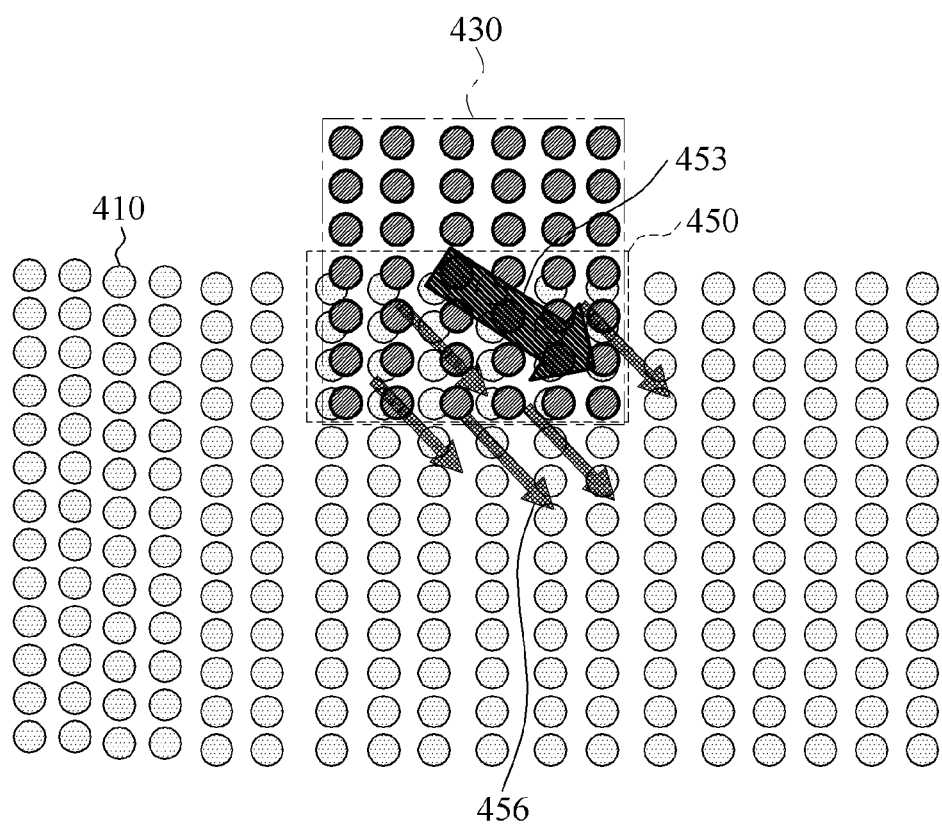
FIG. 4 is a diagram illustrating an example of a method that calculates velocities of particles included in a first object in a method to model objects including particles, in accordance with an embodiment.

FIG. 4 is a diagram illustrating an example of a method to calculate velocities of particles included in a first object in a method of modeling objects including particles, in accordance with an embodiment.

Referring to FIG. 4, a deformable object 430 floating on a fluid object 410 is illustrated. In an overlapping area 450 in which the fluid object 410 and the deformable object 430 coexist, the deformable object 430 has a predetermined velocity value having an identical direction as illustrated by numeral 453 in FIG. 4.

In an example, when a modeling method calculates velocities of particles included in the fluid object 410, a velocity value of the deformable object 430 is applied, thereby enabling the velocities of the particles included in the fluid object 410 to be similar to the velocity value of the deformable object 430.

The modeling method calculates, in the overlapping area, a velocity of the fluid object 410 based on a velocity of the deformable object 430, and determines a predetermined velocity value having an identical direction as illustrated by numeral 456 in FIG. 4 as a velocity of the fluid object 410.

Figure 5:
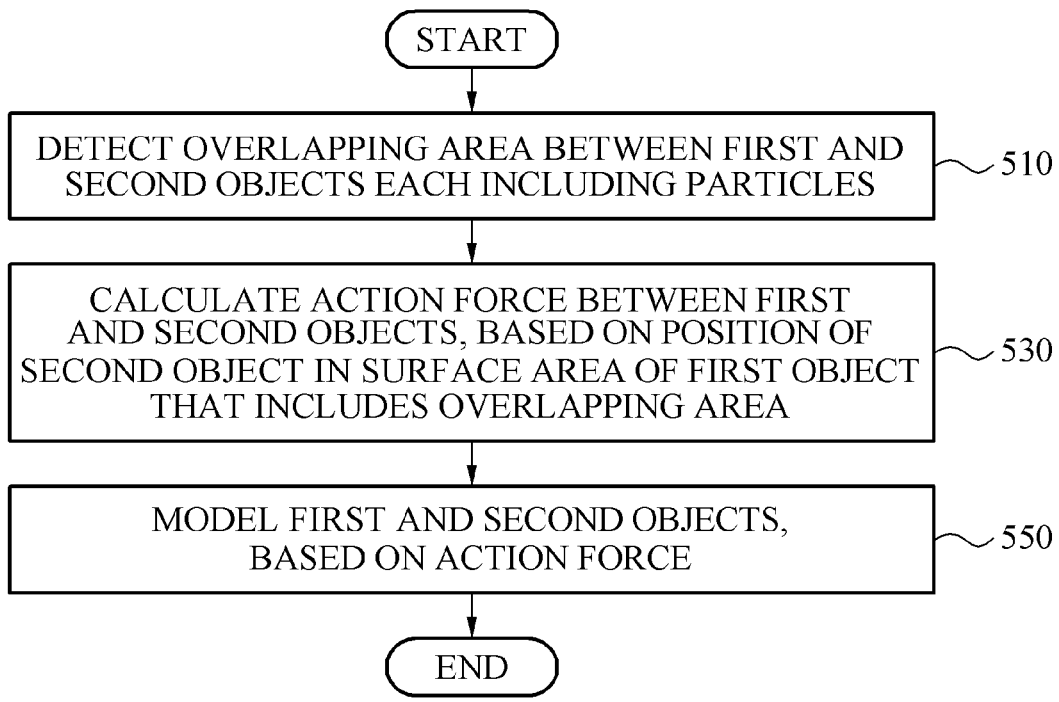
FIG. 5 is a flowchart illustrating still another example of a method to model objects including particles, in accordance with an embodiment.

FIG. 5 is a flowchart illustrating still another example of a method to model objects including particles, in accordance with an embodiment.

Referring to FIG. 5, in operation 510, a modeling method detects an overlapping area between a first object and a second object, each including particles.

In one illustrative configuration, the method to model the objects is performed in a single processor or in multiple structurally interconnected processors. The processor or processors are hardware structural components that perform the operations described and illustrated with respect to FIG. 5. In one configuration, a detector, a controller, and a model processor may be used to perform operations 510 through 550 described below. Due to the complexities and speed of the processing to model objects, the functions performed in FIG. 5 cannot be performed manually.

In operation 530, the modeling method calculates an action force between the first and the second objects, based on a position of the second object in a surface area of the first object that includes the overlapping area detected in operation 510. The modeling method calculates an interaction force between the first and the second objects. A surface area of the first object is referred to as a surface area 713 as illustrated in FIG. 7.

In operation 530, when the second object is at a position at which a collision with the first object is generated in the surface area of the first object that includes the overlapping area, the modeling method calculates the action force between the first and the second objects based on the collision.

Figure 7:
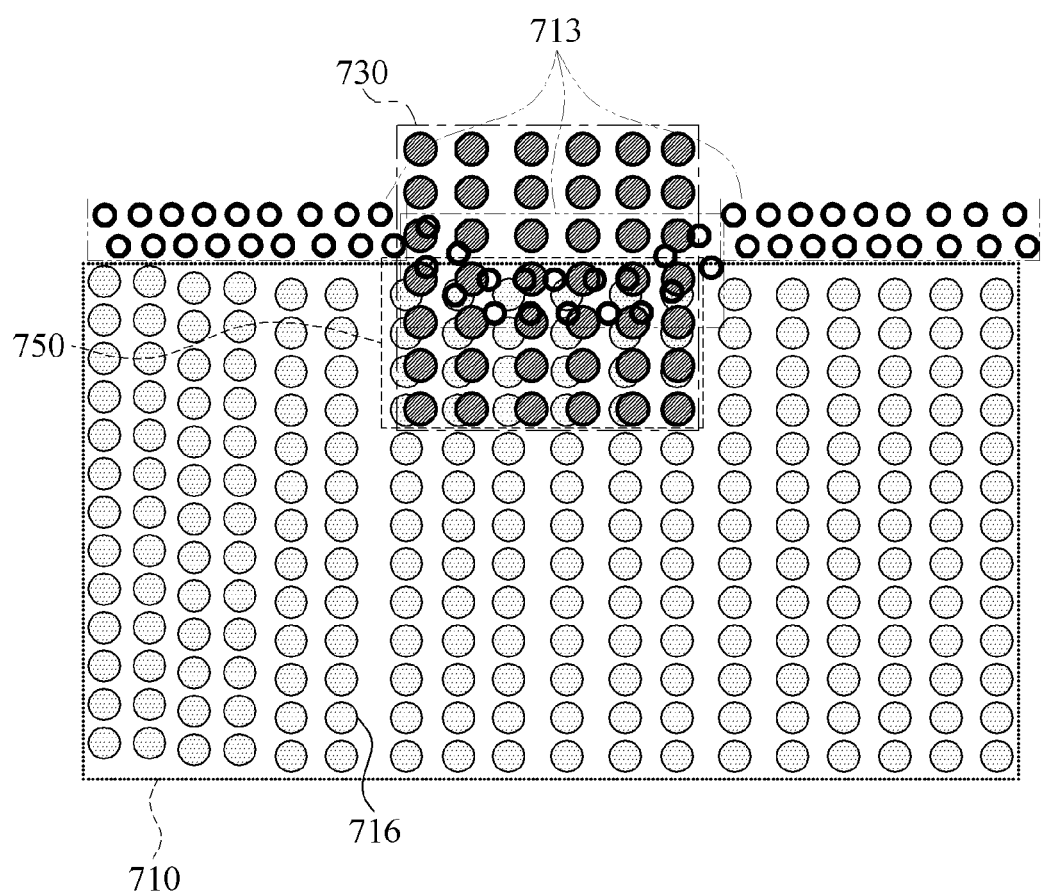
FIG. 7 is a diagram illustrating a surface area of a first object in a method to model objects including particles, in accordance with an embodiment.

In operation 530, when the second object is at a position at which the collision with the first object is not generated in the surface area of the first object, for example, a lower area that is not or excludes the surface area of the first object, such as the lower area 716 of FIG. 7, the modeling method calculates the action force between the first and the second objects, irrespective of the collision.

In an example, the method of calculating the action force between the first and the second objects based on the collision will be described hereinafter.

The modeling method detects particles of the first object generated from a collision between the particles of the first object and the particles of the second object in the surface area of the first object and redefine positions of the detected particles of the first object.

The collision between the particles is a condition in which the particles of the first object, for example, a fluid object, and the particles of the second object, for example, a deformable object, overlap at the same positions. Further, the collision is a position or positions at which particles of fluid object penetrate particles of deformable object.

The modeling method redefines the positions of the particles of the first object as positions at which the first object does not penetrate the second object.

For example, when the first object is a fluid object and the second object is a deformable object, the particles of fluid object fluidly move by avoiding, during the collision, penetration of the particles of the deformable object. Accordingly, when the collision between the particles of the fluid object and the particles of the deformable object is generated, the modeling method models the particles of the fluid object to be at the positions at which the particles of the fluid object do not penetrate the particles of the deformable object.

The modeling method calculates an action force applied to the second object during or at the collision, based on the redefined positions of the particles of the first object. In this example, the modeling method calculates an interaction force reflecting an influence of the first object on the second object and an influence of the second object on the first object.

In operation 550, the modeling method models the first and the second objects, based on the action force calculated in operation 530.

Figure 6A:
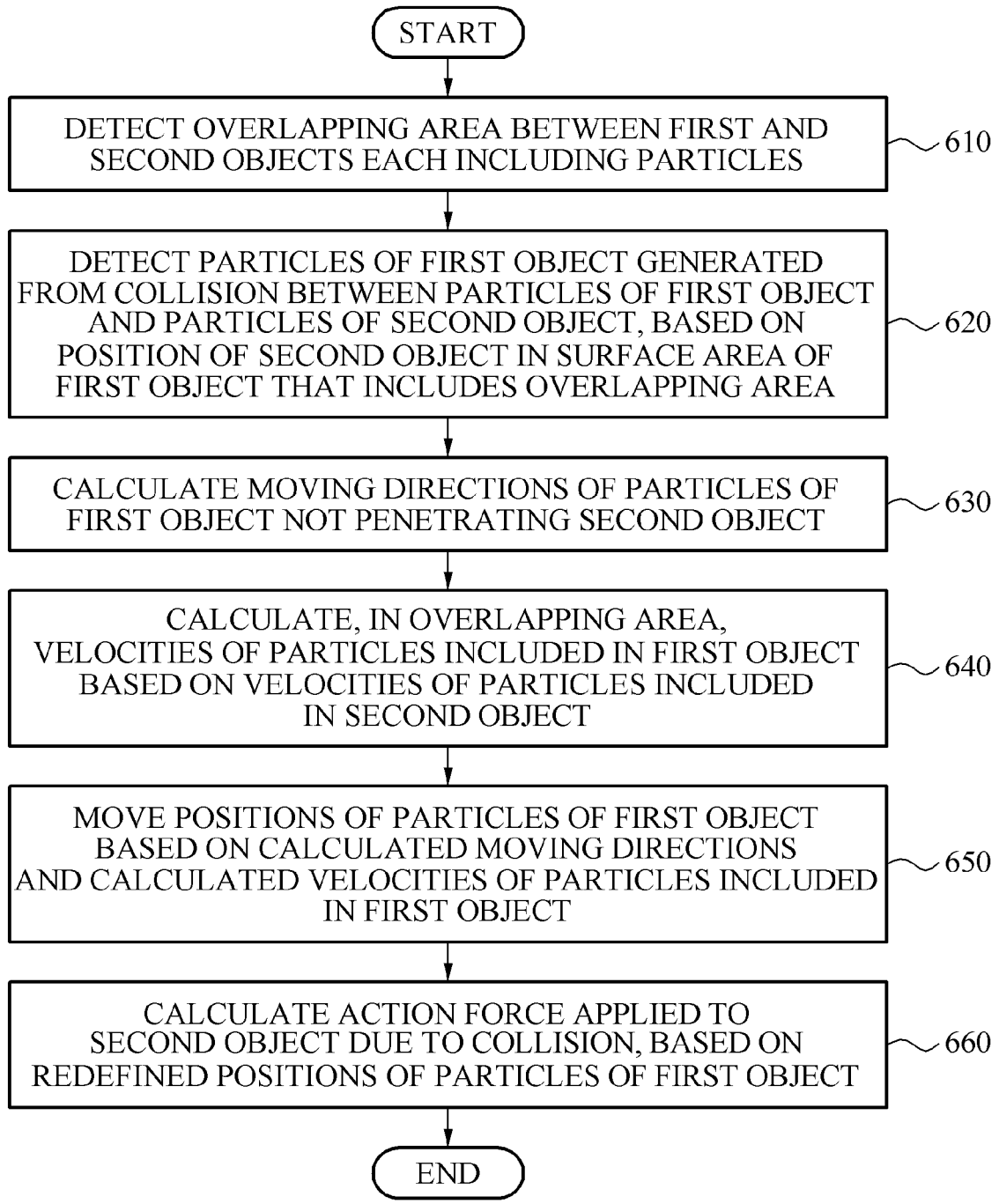
FIG. 6A is a flowchart illustrating a further example of a method to model objects including particles, in accordance with an embodiment.

FIG. 6A is a flowchart illustrating a further example of a method to model objects including particles, in accordance with an embodiment.

Figure 6B:
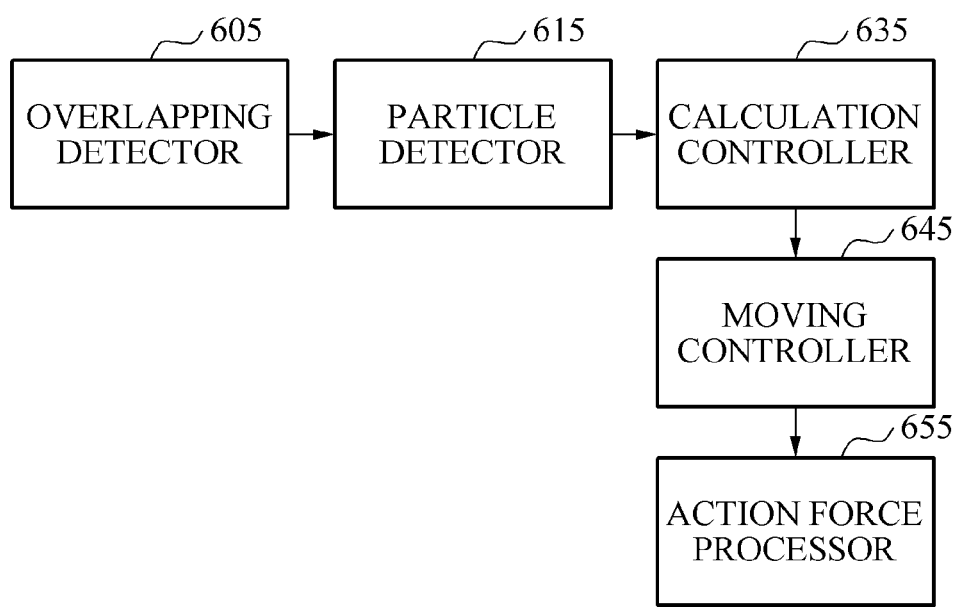
FIG. 6B is a block diagram illustrating a further example of an apparatus to model objects including particles, in accordance with an embodiment.

In one illustrative configuration, the method to model the objects is performed in a single processor or in multiple structurally interconnected processors. The processor or processors are hardware structural components that perform the operations described and illustrated with respect to FIG. 6A. In one configuration, as shown in FIG. 6B, an overlapping detector 605, a particle detector 615, a calculation controller 635, a moving controller 645, and an action force processor 655 may be used to perform operations 610 through 660 described below. Due to the complexities and speed of the processing to model objects, the functions performed in FIG. 6A cannot be performed manually.

In operation 610, a modeling method, through the overlapping detector 605, detects an overlapping area between a first object and a second object, each including particles.

In operation 620, the modeling method, using the particle detector 615, detects particles of the first object generated from a collision between the particles of the first object and the particles of the second object in the surface area of the first object. The particles of the first object generated are detected based on a position of the second object in a surface area of the first object that includes the overlapping area detected in operation 610.

In operation 630, the modeling method, using the calculation controller 635, calculates moving directions of the particles of the first object not penetrating the second object.

In operation 640, the modeling method, using the calculation controller 635, calculates, in the overlapping area, velocities of the particles included in the first object based on velocities of the particles included in the second object.

In operation 650, the modeling method, using the moving controller 645, moves and redefines positions of the particles of the first object based on the moving directions calculated in operation 630 and the velocities of the particles included in the first object calculated in operation 640.

In operation 660, the modeling method, using the action force processor 655, calculates an action force applied to the second object due to the collision, based on the redefined positions of the particles of the first object.

In operation 660, the modeling method, using the action force processor 655, estimates, at the redefined positions of the particles of the first object, forces received by the particles of the first object from the second object. The modeling method also calculates the action force applied to the second object due to the collision based on the estimated forces.

For example, the modeling method and corresponding apparatus reflect forces estimated to be applied to the particles of the fluid object due to the collision between the deformable object and the fluid object as a reaction force with respect to the deformable object by transmitting, to the deformable object, forces symmetrical to impulses applied to the particles of the fluid object.

When the positions of the particles of the fluid object is moved due to the collision, the same magnitude of the forces estimated to be applied to the particles of the fluid object are applied to the deformable object in a symmetrical direction based on, for example, Newton's third law. In this example, the forces estimated to be applied to the particles of the fluid object are calculated using general physics formulae when initial positions of the particles of the fluid object, later positions of the particles of the fluid object, and velocities are provided.

FIG. 7 is a diagram illustrating a surface area of a first object in a method to model objects including particles, in accordance with an embodiment.

Referring to FIG. 7, a fluid object 710 divided by a surface area 713 and a lower area 716, a deformable object 730, and an overlapping area 750 in which the fluid object 710 and the deformable object 730 overlap are illustrated.

In an example, a modeling method performs collision handling on the particles, when a collision is generated among the particles included in the surface area 713 and the overlapping area 750. In this example, in the fluid object 710, because a collision among the particles is not generated in a remaining portion of the lower area 716 other than the surface area 713, the modeling method may not perform the collision handling.

The modeling method models the collision among the particles based on a distance from the deformable object and a height, for example, a surface, of the fluid object. The height, for example, the surface, or a depth of the fluid object is pre-defined.

In an example, the particles of the fluid object are divided into two layers of the surface area 713 and the lower area 716. The particles included in the surface area 713 perform collision handling and the particles included in the lower area 716 do not perform collision handling, thereby reducing a calculation amount during the modeling.

Figure 8:
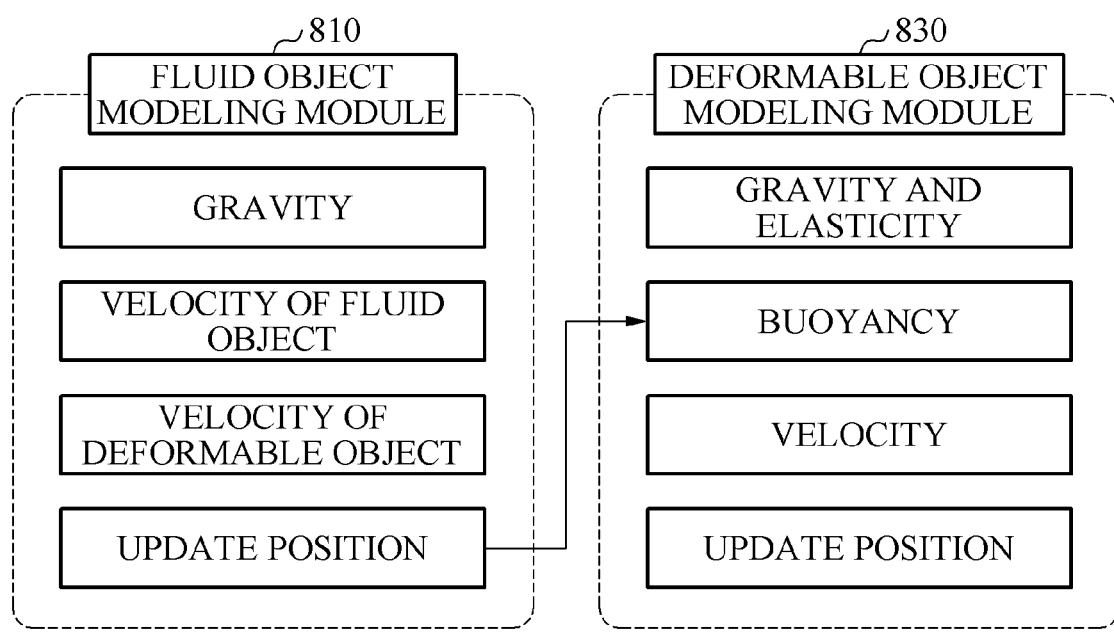
FIG. 8 is a diagram illustrating an example of an apparatus to model an action force between a fluid object and a deformable object in lieu of a collision handling, in accordance with an embodiment.

FIG. 8 is a diagram illustrating an example of an apparatus to model an action force between a fluid object and a deformable object in lieu of a collision handling, in accordance with an embodiment.

Referring to FIG. 8, an apparatus including a fluid object modeling module 810 and a deformable object modeling module 830 is illustrated. The fluid object modeling module 810 and the deformable object modeling module 830 are hardware components including, for example, a physical device that physically performs one or more operations, but is not limited thereto. Examples of hardware components include controllers, microphones, amplifiers, low-pass filters, high-pass filters, band-pass filters, analog-to-digital converters, digital-to-analog converters, and processing devices.

The fluid object modeling module 810 calculates a momentum conservation equation among particles of the fluid object. For example, the fluid object modeling module 810 calculates the momentum conservation equation approximating first particles based on second particles adjacent to the first particles, and calculate densities, external forces, and viscosities of the entire particles including the first particles and the second particles.

For example, the fluid object modeling module 810 initializes information associated with masses, densities, velocities, and positions of the particles corresponding to the fluid object in a predetermined space or area.

The fluid object modeling module 810 determines a time step to model an action force between particles of the fluid object and particles of deformable object. For example, the fluid object modeling module 810 processes the external force, for example, a gravity, and determine a velocity of the fluid object based on viscosities of the fluid object and the deformable object. The fluid object modeling module 810 updates positions of the particles of the fluid object based on the determined velocity of the fluid object.

The fluid object modeling module 810 provides the deformable object modeling module 830 with the updated positions of the particles of the fluid object.

The deformable modeling module 830 models, similar to the fluid object, a gravity and an elasticity, and the like, and calculates a buoyancy with reference to the updated positions of the particles of the fluid object transmitted by the fluid object modeling module 810.

The deformable object modeling module 830 calculates the velocity of the deformable object, and updates a final position of the deformable object based on the calculated velocity and buoyancy of the deformable object.

Figure 9:
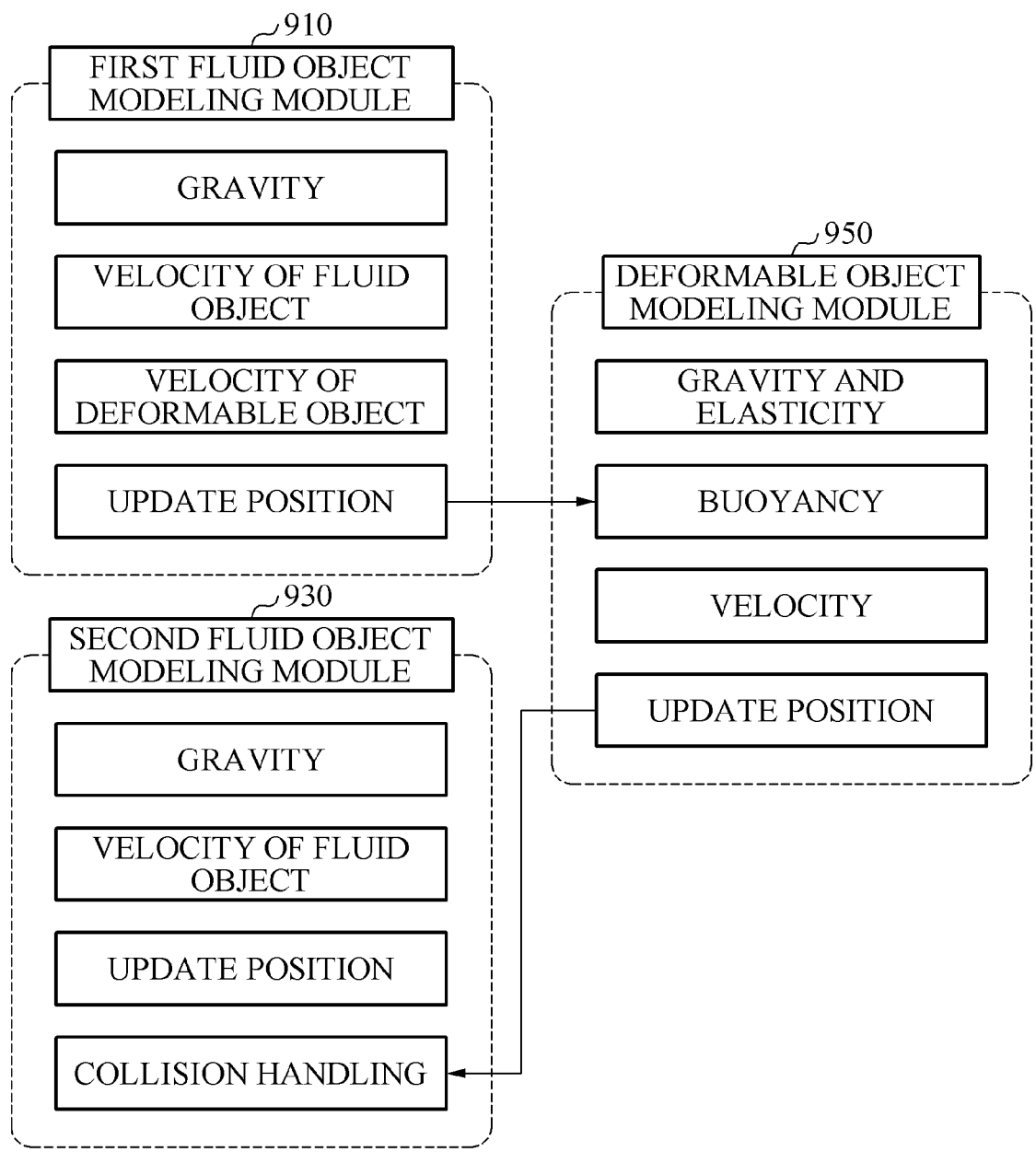
FIG. 9 is a diagram illustrating an example of an apparatus to model an interaction between a fluid object and a deformable object by performing of a collision handling, in accordance with an embodiment.

FIG. 9 is a diagram illustrating an example of an apparatus to model an interaction between a fluid object and a deformable object by performing of a collision handling, in accordance with an embodiment.

Referring to FIG. 9, an apparatus including a first fluid object modeling module 910 not performing collision handling, a second fluid object modeling module 930 performing collision handling, and a deformable object modeling module 950 is illustrated. The first fluid object modeling module 810 and the deformable object modeling module 830 are hardware components including, for example, a physical device that physically performs one or more operations, but is not limited thereto. Examples of hardware components include controllers, microphones, amplifiers, low-pass filters, high-pass filters, band-pass filters, analog-to-digital converters, digital-to-analog converters, and processing devices.

Because the structural and functional configurations of the first fluid object modeling module 910 and the deformable object modeling module 950 are same to the structural and functional configurations of the fluid object modeling module 810 and the deformable object modeling module 830, repeated descriptions will be omitted conciseness.

A structural and functional operation of the second fluid object modeling module 930 are similar to the operation of the first fluid object modeling module 910. However, there may be a difference in that the second fluid object modeling module 930 performs collision handling.

The second fluid object modeling module 930 performs collision handling based on the updated final position of the deformable object, the velocity and the buoyancy of the deformable object calculated in the deformable object modeling module 950.

The second fluid object modeling module 930 models the particles of the fluid object by determining whether each of the particles of the fluid object included in a fluid object field collides the deformable object, based on the final position of the deformable object.

Figure 10:
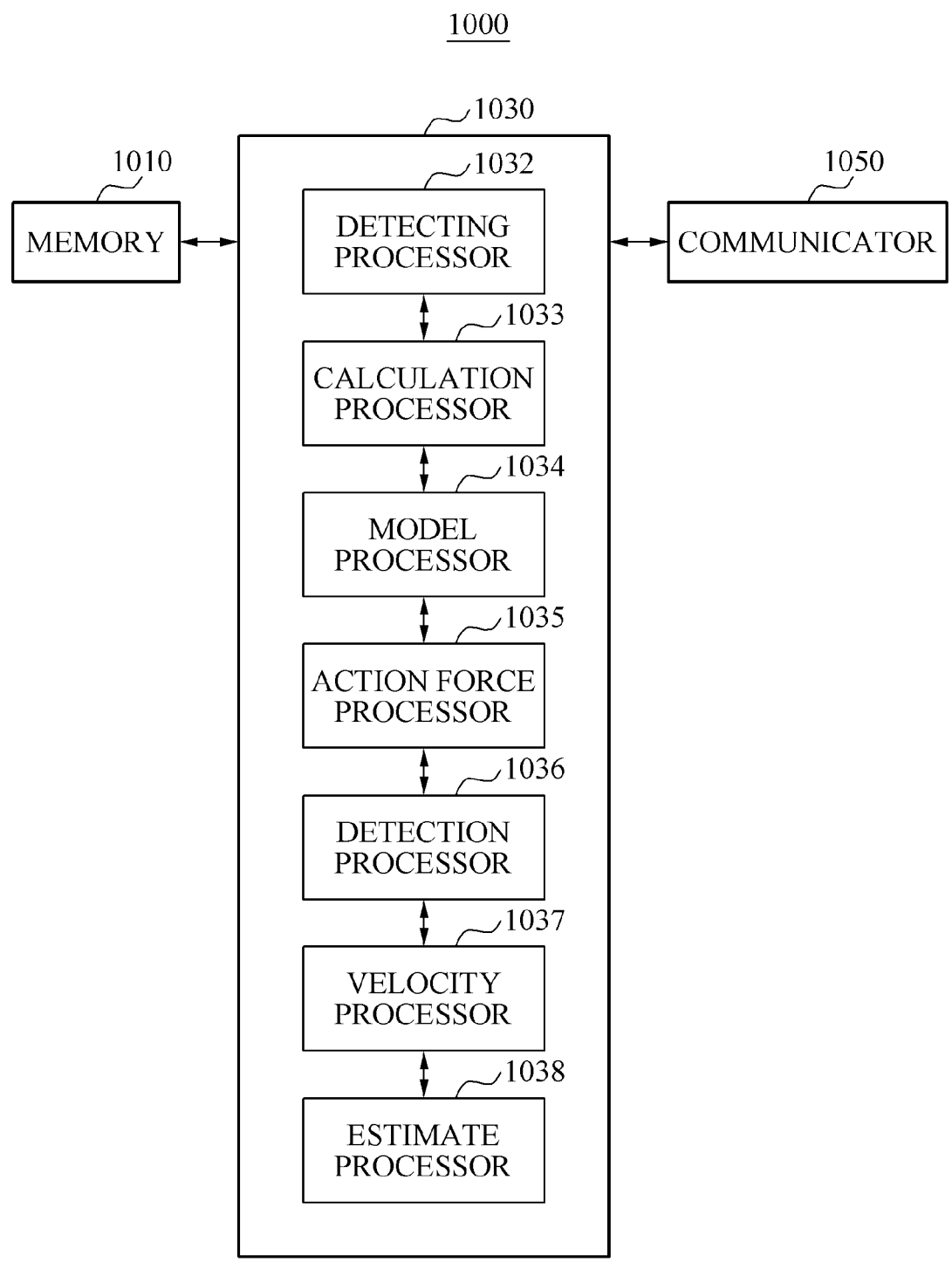
FIG. 10 is a block diagram illustrating an example of an apparatus to model objects including particles, in accordance with an embodiment.

FIG. 10 is a block diagram illustrating an example of an apparatus to model objects including particles, in accordance with an embodiment.

Referring to FIG. 10, an apparatus to model (hereinafter referred to as a modeling apparatus) 1000 is configured to include a memory 1010 and a processor 1030. The modeling apparatus 1000 may further include a communicator 1050.

The memory 1010 is configured to record a program to control an apparatus for modeling.

The processor 1030 is configured to control a program stored in the memory 1010. In this example, the processor 1030 may be a single processor or multiple processors.

In one configuration, the processor 1030 includes substructural components including a detecting processor 1032, a calculation processor 1033, a model processor 1034, an action force processor 1035, a detection processor 1036, a velocity processor 1037, and an estimate processor 1038. Although each processor is illustrated as separate structural elements, a person of ordinary skill in the relevant art will appreciate that a single processor may be used configured to perform each of the functions associated with each of the processors described in FIG. 10.

The detecting processor 1032 is configured to detect an overlapping area between a first and a second objects each including particles, and model the first object and the second object based on an action force between the first and the second objects calculated in the overlapping area.

The calculation processor 1033 is configured to calculate, in the overlapping area, buoyancy due to the first object overlapping the second object. The calculation processor 1033 is further configured to calculate, in the overlapping area, velocities of the particles included in the first object adjacent to the second object based on velocities of the particles included in the second object.

The model processor 1034 is configured to model, in the overlapping area, a motion of the first object independent of the second object. The action force processor 1035 is configured to calculate the action force between the first and the second objects, based on a position of the second object in a surface area of the first object that includes the overlapping area.

The detection processor 1036 is configured to detect particles of the first object generated from a collision between the particles of the first object and the particles of the second object in the surface area of the first object, and calculate an action force applied to the second object due to the collision, based on the redefined positions of the detected particles of the first object.

The velocity processor 1037 is configured to calculate, in the overlapping area, velocities of the particles included in the first object based on velocities of the particles included in the second object, calculate moving directions of the particles of the first object, which does not penetrate the second object, and move the positions of the particles of the first object based on the calculated moving directions.

The estimate processor 1038 is configured to estimate, in the redefined positions of the particles of the first object, forces received by the particles of the first object from the second object, and calculate the action force applied to the second object due to the collision based on the estimated forces.

The communicator 1050 is configured to receive and transmit information required for operating the apparatus for modeling the objects including particles.

The apparatuses, controllers, detectors, memory, processors, modules, devices, and other components illustrated in FIGS. 6B and 8-10 that perform the operations described herein with respect to FIGS. 2-3 and 5-6A are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-3 and 5-6A. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-3 and 5-6A that perform the operations described herein with respect to FIGS. 6B and 8-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method to model fluid interactions in computer graphics, the method comprising:
    detecting an overlapping area between first and second objects each comprising particles, the first object and the second object contacting each other;
    calculating, in the overlapping area, an action force between the first and the second objects;
    generating a simulation model modeling the first object and the second object based on an action force applied by the first object to the second object, and
    providing a visual effect for the fluid interactions based on the generated simulation model,
    wherein, in the overlapping area, the modeling applies the action force to model a motion of the first object independent of the second object.

2. The method of claim 1, wherein the calculating comprises calculating, in the overlapping area, a buoyancy due to the first object overlapping the second object.

3. The method of claim 1, wherein the calculating comprises calculating, in the overlapping area, velocities of the particles comprised in the first object based on velocities of the particles comprised in the second object.

4. The method of claim 1, wherein the calculating comprises calculating the action force between the first and the second objects based on a position of the second object in a surface area of the first object, which comprises the overlapping area.

5. The method of claim 4, wherein the calculating comprises:
    detecting particles of the first object generated from a collision between the particles of the first object and the particles of the second object in the surface area of the first object;
    redefining positions of the detected particles of the first object; and
    calculating an action force applied to the second object due to the collision, based on the redefined positions of the particles of the first object.

6. The method of claim 5, wherein the redefining comprises redefining the positions of the particles of the first object as positions at which the first object does not penetrate the second object.

7. The method of claim 5, wherein the redefining comprises:
    calculating moving directions of the particles of the first object not penetrating the second object; and
    moving the positions of the particles of the first object based on the calculated moving directions.

8. The method of claim 7, further comprising:
    calculating, in the overlapping area, velocities of the particles comprised in the first object based on velocities of the particles comprised in the second object; and
    wherein the moving comprises moving the positions of the particles of the first object based on the calculated moving directions and the calculated velocities of the particles comprised in the first object.

9. The method of claim 5, wherein the calculating comprises:
    estimating, at the redefined positions of the particles of the first object, forces received by the particles of the first object from the second object; and
    calculating the action force applied to the second object due to the collision, based on the estimated forces.

10. A non-transitory computer-readable storage medium comprising a program comprising instructions to cause a computer to perform the method of claim 1.

11. The method of claim 1, wherein the collision between particles is generated only in the surface area, and is not generated in a lower area below the surface area.

12. The method of claim 1, further comprising
    determining external forces, and viscosities of combined particles of the first object and the second object upon contact, determining a velocity of the first object based on the external forces and on the combined viscosities, updating positions of particles of the first object, determining a buoyancy of the second object based on an elasticity of the second object with reference to the updated positions of the particles of the first object, determining a velocity of the second object based on the buoyancy, and updating a position of the second object based on the velocity of the second object and the buoyancy of the second object.

13. The method of claim 1, further comprising determining external forces, and viscosities of combined particles of the first object and the second object upon contact.

14. The method of claim 1, wherein the first object comprises a fluid object, and the second object comprises a deformable object, wherein, in the overlapping area, the modeling models the motion of the first object as though the second object does not overlap the first object, although the first object and the second object overlap in actuality, and wherein the action force comprises a buoyancy applied to the second object due to the first object overlapping the second object.

15. An apparatus to model fluid interactions in computer graphics, the apparatus comprising:

one or more processors configured to:

detect an overlapping area between a first object and a second object each comprising particles and contacting each other; and generate a simulation model modeling the first and the second objects based on an action force calculated in the overlapping area applied by the first object to the second object, and provide a visual effect for the fluid interactions based on the generated simulation model, wherein, in the overlapping area, the modeling applies the action force to model a motion of the first object independent of the second object.

16. The apparatus of claim 15, further comprising:

a memory configured to store a program to control the one or more processors to implement the detecting of the overlapping area and the generation of the simulation model.

17. The apparatus of claim 15, where the one or more processors are further configured to calculate, in the overlapping area, a buoyancy due to the first object overlapping the second object.

18. The apparatus of claim 15, where the one or more processors are further configured to calculate, in the overlapping area, velocities of the particles comprised in the first object based on velocities of the particles comprised in the second object.

19. The apparatus of claim 15, where the one or more processors are further configured to calculate the action force between the first and the second objects, based on positions of the second object in a surface area of the first object that comprises the overlapping area.

20. The apparatus of claim 19, where the one or more processors are further configured to detect particles of the first object generated from a collision between the particles of the first object and the particles of the second object in the surface area of the first object, and calculate an action force applied to the second object due to the collision, based on redefined positions of the detected particles of the first object.

21. The apparatus of claim 20, where the one or more processors are further configured to estimate, in the redefined positions of the particles of the first object, forces received by the particles of the first object from the second object, and calculate the action force applied to the second object due to the collision based on the estimated forces.

22. The apparatus of claim 19, where the one or more processors are further configured to calculate, in the overlapping area, velocities of the particles comprised in the first object based on velocities of the particles comprised in the second object, calculate moving directions of the particles of the first object not penetrating the second object, and move the positions of the particles of the first object based on the calculated moving directions and the calculated velocities of the particles comprised in the first object.

23. An apparatus to model fluid interactions in computer graphics, comprising:

one or more processors configured to:

detect an overlapping area between a first object and a second object, where the first object and the second object contact each other;

detect particles of the first object generated from a collision between particles of the first object and particles of the second object in the surface area of the first object;

calculate moving directions of the particles of the first object not penetrating the second object, and calculate, in the overlapping area, velocities of the particles included in the first object based on velocities of the particles included in the second object;

move and redefine positions of the particles of the first object based on the moving directions calculated and the velocities of the particles in the first object; and estimate, at the redefined positions of the particles of the first object, forces received by the particles of the first object from the second object, to calculate an action force applied due to the collision based on the estimated forces; and provide a visual effect for the fluid interactions based on the first object and the second object.

24. The apparatus of claim 23, wherein the particles of the first object generated are detected based on a position of the second object in a surface area of the first object that includes the overlapping area detected.

25. The apparatus of claim 23, wherein the first object is a fluid object and the second object is a deformable object.

26. A processor implemented method to model fluid interactions in computer graphics, the method comprising:

detecting an overlapping area between first and second objects each comprising particles, the first object and the second object contacting each other;

calculating, in the overlapping area, an action force between the first and the second objects;

generating a simulation model modeling the first object and the second object based on an action force applied by the first object to the second object, and providing a visual effect for the fluid interactions based on the generated simulation model, wherein, in the overlapping area, the modeling applies the action force to model a motion of the first object by assuming that the second object does not overlap the first object.

* * * * *